(12) United States Patent
Sadasivam et al.

(10) Patent No.: US 9,991,920 B2
(45) Date of Patent: Jun. 5, 2018

(54) SYSTEM AND METHOD FOR DYNAMICALLY MODIFYING SETTINGS OF A COMMUNICATION DEVICE

(71) Applicant: HCL Technologies Limited, Noida (IN)

(72) Inventors: Siva Sakthivel Sadasivam, Chennai (IN); Vishal Chaudhary, Sunnyvale, CA (US)

(73) Assignee: HCL Technologies Limited, Noida (IN)

( * ) Notice: Subject to any disclaimer, the term of this patent is extended or adjusted under 35 U.S.C. 154(b) by 0 days. days.

(21) Appl. No.: 15/363,758

(22) Filed: Nov. 29, 2016

(65) Prior Publication Data

US 2017/0168457 A1 Jun. 15, 2017

(30) Foreign Application Priority Data

Dec. 9, 2015 (IN) .......................... 4012/DEL/2015

(51) Int. Cl.
  *G08B 1/08* (2006.01)
  *H04B 1/3827* (2015.01)
  *G04G 3/00* (2006.01)

(52) U.S. Cl.
  CPC ............... *H04B 1/385* (2013.01); *G04G 3/00* (2013.01)

(58) Field of Classification Search
  CPC ..... A61B 5/14532; A61B 5/01; A61B 5/0402; A61B 5/02055; A61B 5/0006; A61B 5/0008; A61B 5/0537; A61B 5/6804; A61B 5/6833; A61B 10/0012; A61B 2010/0019; A61B 2560/0209; A61B 2560/0214; A61B 2560/0412; A61B 2560/045; A61B 5/145;

(Continued)

(56) References Cited

U.S. PATENT DOCUMENTS 8,519,841 B2    8/2013  Fukuyori
2007/0100666 A1* 5/2007  Stivoric ............... A61B 5/0008
                                                        705/3

(Continued)

OTHER PUBLICATIONS

Christine LÆtitia Lisetti, Fatma Nasoz, "Using Noninvasive Wearable Computers to Recognize Human Emotions from Physiological Signals", Jul. 30, 2002, 16 pages.

*Primary Examiner* — Daniel Previl
(74) *Attorney, Agent, or Firm* — Shumaker, Loop & Kendrick, LLP (57) ABSTRACT

Disclosed is a system for dynamically modifying settings of a communication device based on an activity state of a user of the communication device. A data capturing module captures values corresponding to a plurality of physiological parameters associated to a plurality of activity states of a user. The values may be captured by using one or more wearable devices worn by a user. A configuration module enables the user to configure one or more rules and one or more events, to be triggered, corresponding to each of the one or more rules for modifying settings of the communication device. An activity state determining module determines an activity state, in real-time, from the plurality of activity states. An event triggering module triggers an event, of the one or more events, based on a rule configured corresponding to the activity state in order to dynamically modify the settings of the communication device.

12 Claims, 4 Drawing Sheets

(58) Field of Classification Search
CPC ..... A61B 5/0022; A61B 5/021; A61B 5/0476; A61B 5/0488; A61B 5/0496; A61B 5/4812; A61B 5/0823; A61B 5/113; A61B 5/222; A61B 5/4836; A61B 5/6805; A61B 5/726; A61B 5/7264; A61B 5/0059; A61B 5/0205; A61B 5/02416; A61B 5/053; A61B 5/14503; A61B 5/1455; A61B 5/1495; A61B 5/4809; A61B 5/4839; A61B 5/7282; A61B 5/746; A61B 5/7475; A61B 2562/0219; A61B 2562/08; A61B 5/0002; A61B 5/024; A61B 5/02438; A61B 5/048; A61B 5/0484; A61B 5/0533; A61B 5/0816; A61B 5/0871; A61B 5/107; A61B 5/11; A61B 5/1135; A61B 5/16; A61B 5/4076; A61B 5/411; A61B 5/681; A61B 5/7203; A61B 5/725; A61B 5/7275; A61B 5/7405; A61B 5/742; A61B 5/7425; A61B 5/7455; A61B 7/003; A61B 2503/04; A61B 2503/10; A61B 2503/40; A61B 3/0285; A61B 5/0255; A61B 5/026; A61B 5/04; A61B 5/04012; A61B 5/165; A61B 5/4064; A61B 5/4082; A61B 5/4088; A61B 5/4815; A61B 5/4866; A61B 5/6814; A61B 5/72; A61B 5/7225; A61B 5/486; A61B 5/744; A61B 5/0077; A61B 5/1118; A61B 5/1123; A61B 5/14546; G01K 1/022; G01K 1/024; G01K 1/02; G06F 19/3418; G06F 19/345; G06F 19/3468; G06F 19/322; G06F 19/3487; G06F 17/5009; G06F 19/12; G06F 19/26; G06F 19/28; G06F 2217/10; G06F 17/30321; G06F 17/30864; G06F 17/5018; G06F 3/06; G06F 17/13; G06F 19/3431; G06F 19/3481; G06F 21/6254; G06F 2217/16; G06F 2217/80; G06F 17/211; G06F 17/30554; G06F 17/30566; G06F 17/30867; G06F 17/40; G06F 19/24; G06F 19/324; G06F 19/325; G06F 19/3406; G06F 19/3437; G06F 19/3456; G06F 2217/46; G06F 3/0484; G06F 3/04842; G06F 3/04845; G06F 3/04847; F02D 41/021; F02D 2200/701; F02D 41/0235; F02D 41/1438; G06Q 50/24; G06Q 50/22; G06Q 10/063114; G06Q 10/10; G06Q 10/103; G06Q 10/107; A61M 2205/52; A61M 2005/14208; A61M 2005/1726; A61M 2230/201; A61M 5/16827; A61M 5/1723; A61M 2205/6009; A61M 2205/6054; A61M 35/00; A63F 13/06; A63F 2300/1012; A63F 13/217; A63F 13/235; A63F 13/245; A63F 13/42; A63F 2003/0481; A63F 2009/2442; A63F 2009/2489; A63F 2250/32; A63F 9/24; F24F 11/0034; G01N 2800/2864; G01N 33/6896; G01N 33/0098; G01N 2291/044; G01N 2333/485; G01N 2333/52; G01N 2333/252; G01N 2333/70539; G01N 2333/91188; G01N 2333/916; G01N 2500/00; G01N 2800/102; G01N 2800/12; G01N 2800/122; G01N 2800/321; G01N 2800/52; G01N 2800/56; G01N 29/14; G01N 29/50; G01N 33/6863; G01N 33/6893; G01N 33/92; G01N 29/0814; G01R 1/02; G01R 31/31912; G01R 33/02; G01R 33/07; G05B 17/02; G05B 1/01; G05B 19/056; G05B 2219/35109; G05B 19/05; G05B 19/41875; G05B 2219/15018; G05B 2219/32182; G05B 2219/32187; G05B 2219/32208; G05B 2219/37224; G05B 15/02; G05B 19/048; G05B 2219/24015; G05B 23/0283; B08B 5/02; B08B 9/093; C12Q 2600/156; C12Q 1/6883; C12Q 1/42; C12Q 1/52; C12Q 1/6886; C12Q 2600/136; C12Q 2600/158; F22B 35/00; F22B 35/18; F22B 37/56; F22B 37/565; F23J 3/02; F28G 15/003; F28G 9/00; H04L 67/10; H04L 63/0421; H04L 63/18; H04L 41/0816; H04L 67/1002; H04L 67/1008; H04L 67/101; H04L 67/1029; H04L 67/1095; A01G 25/167; A61K 31/7028; A61K 31/7032; A61K 31/7048; A61K 31/352; A61K 31/4025; A61K 31/4245; B60W 2050/008; B64C 11/001; B64D 2027/026; B64D 27/24; C07H 15/18; C07H 15/26; E02F 3/304; E02F 3/48; E02F 9/262; E02F 9/264; F01N 2560/02; F01N 2900/08; F01N 2900/12; F01N 9/00; G01C 21/20; G01C 23/00; G07C 5/008; G08B 21/02; G08G 5/0021; G08G 5/0034; G08G 5/0052; G08G 5/0086; G09B 19/00; H04W 4/005; H04W 84/18; Y02P 80/30; Y02P 90/22; Y02P 90/86; Y02T 10/47; Y02T 50/675; A61J 1/03; A61J 2200/30; A61J 2205/60; A61J 3/074; A61N 1/0529; A61N 1/36096; A63B 2024/0065; A63B 2220/12; A63B 2220/40; A63B 2230/04; A63B 2230/06; A63B 24/0062; A63B 71/0622; B64F 5/60
USPC ...... 340/539.1, 500, 539.12, 539.11, 539.22, 340/539.26, 575, 593, 588–589, 636.18, 340/692, 539.21, 691.3, 5.52, 286.07
See application file for complete search history.

(56) References Cited

U.S. PATENT DOCUMENTS

| | | |
|---|---|---|
| 2012/0083668 A1 | 4/2012 | Pradeep et al. |
| 2014/0249853 A1 | 9/2014 | Proud et al. |
| 2015/0046179 A1* | 2/2015 | Kang ................. G06F 19/3418 705/2 |
| 2015/0172441 A1* | 6/2015 | Samhat ............. H04M 1/72563 455/418 |
| 2015/0371516 A1* | 12/2015 | Petersen ................ G08B 21/02 340/539.12 |
| 2016/0371446 A1* | 12/2016 | Otin ..................... G06F 19/345 |
| 2017/0238864 A1* | 8/2017 | Raymann ............. H04W 4/70 |

* cited by examiner

SYSTEM AND METHOD FOR DYNAMICALLY MODIFYING SETTINGS OF A COMMUNICATION DEVICE

CROSS REFERENCE TO RELATED APPLICATIONS

The present application claims priority from Indian Patent Application No. 4012/DEL/2015, filed on Dec. 9, 2015, the entirety of which is hereby incorporated by reference.

TECHNICAL FIELD

The present subject matter described herein generally relates to dynamically modifying settings of a communication device, and more particularly relates to systems and methods for dynamically modifying the settings based on a state of a user of the communication device.

BACKGROUND

It has been observed that the number of mobile phone users is increasing day by day around the world. Since the mobile phone has various capabilities to keep the user updated regarding information from around the world, the user, now-a-days, only relies on the mobile phone for getting the updated information and therefore always keep the smart communication device with himself/herself. As a result, sometimes the user may forget to change the settings of the mobile phone while attending a meeting or a conference resulting in embarrassment in front of an audience, in a board room meeting, or a conference hall respectively. Although, now-a-days, traditional mobile phones have been replaced with more advanced Smartphones, the Smartphones available today are still not smart enough to determine the physiological state, based on physiological parameters associated with the user, or the location of the user in order to change the settings of the Smartphone itself.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for dynamically modifying settings of a communication device based on a state of a user of the communication device and the concepts are further described below in the detailed description.

In one implementation, a system for dynamically modifying settings of a communication device based on an activity state of a user of the communication device is disclosed. In one aspect, the system may include a processor and a memory coupled to the processor. The processor may execute a plurality of modules stored in the memory. The plurality of modules may include a data capturing module, a configuration module, an activity state determining module, and an event triggering module. The data capturing module may capture values corresponding to a plurality of physiological parameters associated to a plurality of activity states of a user. The values may be captured by using one or more wearable devices worn by a user. The configuration module may enable the user to configure one or more rules based on the values corresponding to the plurality of physiological parameters. In one aspect, each rule may correspond to an activity state of the user. The configuration module may further enable the user to configure one or more events, to be triggered, corresponding to each of the one or more rules for modifying settings of the communication device. The activity state determining module may determine an activity state, in real-time, from the plurality of activity states based upon at least one real time value captured corresponding to at least one physiological parameter. The event triggering module may trigger an event, of the one or more events, based on a rule configured corresponding to the activity state in order to dynamically modify the settings of the communication device.

In another implementation, a method for dynamically modifying settings of a communication device based on an activity state of a user of the communication device is disclosed. In order to modify the settings, initially, values corresponding to a plurality of physiological parameters associated to a plurality of activity states of a user may be captured. After capturing the values, the user may be enabled to configure, one or more rules based on the values corresponding to the plurality of physiological parameters. In one aspect, each rule may correspond to an activity state of the user. The user may further be enabled to configure one or more events, to be triggered, corresponding to each of the one or more rules for modifying settings of the communication device. After configuring the one or more rules and the one or more events, an activity state may be determined, in real-time, from the plurality of activity states based upon at least one real time value captured corresponding to at least one physiological parameter. Subsequent to the determination of the activity state, an event, of the one or more events, may be triggered based on a rule configured corresponding to the activity state in order to dynamically modify the settings of the communication device. In one aspect, the aforementioned method for dynamically modifying settings of a communication device based on the activity state of a user of the communication device is performed by a processor using programmed instructions stored in a memory.

In yet another implementation, non-transitory computer readable medium embodying a program executable in a computing device for dynamically modifying settings of a communication device based on an activity state of a user of the communication device is disclosed. The program may include a program code for assigning capturing values corresponding to a plurality of physiological parameters associated to a plurality of activity states of a user, wherein the values are captured using one or more wearable devices worn by a user. The program may include a program code for enabling the user to configure one or more rules based on the values corresponding to the plurality of physiological parameters, wherein each rule corresponds to an activity state of the user. The program may include a program code for enabling the user to configure one or more events, to be triggered, corresponding to each of the one or more rules for modifying settings of the communication device. The program may include a program code for determining an activity state, in real-time, from the plurality of activity states based upon at least one real time value captured corresponding to at least one physiological parameter. The program may include a program code for triggering an event, of the one or more events, based on a rule configured corresponding to the activity state in order to dynamically modify the settings of the communication device.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present system and method facilitates dynamically modify settings of a communication device based on an activity state of a user of the communication device is disclosed. Examples of the activity state of the user may include, but are not limited to, Sleeping, Jogging, Sitting in the office, and Sitting in the canteen. In order to modify the settings, the present system captures values corresponding to a plurality of physiological parameters associated to a plurality of activity states. The plurality of physiological parameters may be captured by using one or more wearable devices while the user is in at least one activity state of the plurality of activity states. Examples of the plurality of physiological parameters may include, but are not limited to, wrist pulse, Peripheral capillary oxygen saturation (SPO2), Temperature, Electrocardiogram (ECG), Body vibrations, Body orientation with compass, Global Positioning System (GPS), and Electroencephalography (EEG). It must be understood that the one or more wearable devices may be coupled with the body of the user. Examples of the one or more wearable devices may include, but not limited to, a pedometer, a SPO2 sensor, earring(s), a head band, a glass, smart watch, and a smart belt.

After capturing the values, the user may be enabled to configure one or more rules. Examples of the one or more rules may include, but are not limited to, putting the communication device in silent mode when the user is sleeping, putting the communication device in silent mode when the user is sitting in office, putting the communication device in switch on mode when the user is jogging, and putting the communication device in loud mode when the user is sitting in canteen. In one aspect, the one or more rules may be configured based on the values corresponding to the plurality of physiological parameters. It must be understood that each rule corresponds to an activity state of the user. The user may further be enabled to configure one or more events, to be triggered, corresponding to each of the one or more rules for modifying settings of the communication device. It must be understood that the user may be enabled to configure the one or more rules and the one or more events, corresponding to the one or more rules, via a user interface of the communication device. Examples of the one or more events may include, but not limited to, putting the communication device in silent mode, putting the communication device in switch on mode, and putting the communication device in loud mode.

Once the user configures the one or more rules and the one or more events, an activity state may be determined, in real-time, from the plurality of activity states based upon at least one real time value captured corresponding to at least one physiological parameter. Subsequently, an event, of the one or more events, may be triggered in order to dynamically modify the settings of the communication device. In one embodiment, the event may be triggered based on a rule configured corresponding to the activity state. Thus, in this manner, the settings of the communication device may be dynamically modified based on the activity state of the user of the communication device.

While aspects of described system and method for dynamically modifying settings of the communication device and may be implemented in any number of different computing systems, environments, and/or configurations, the embodiments are described in the context of the following exemplary system.

Figure 1:
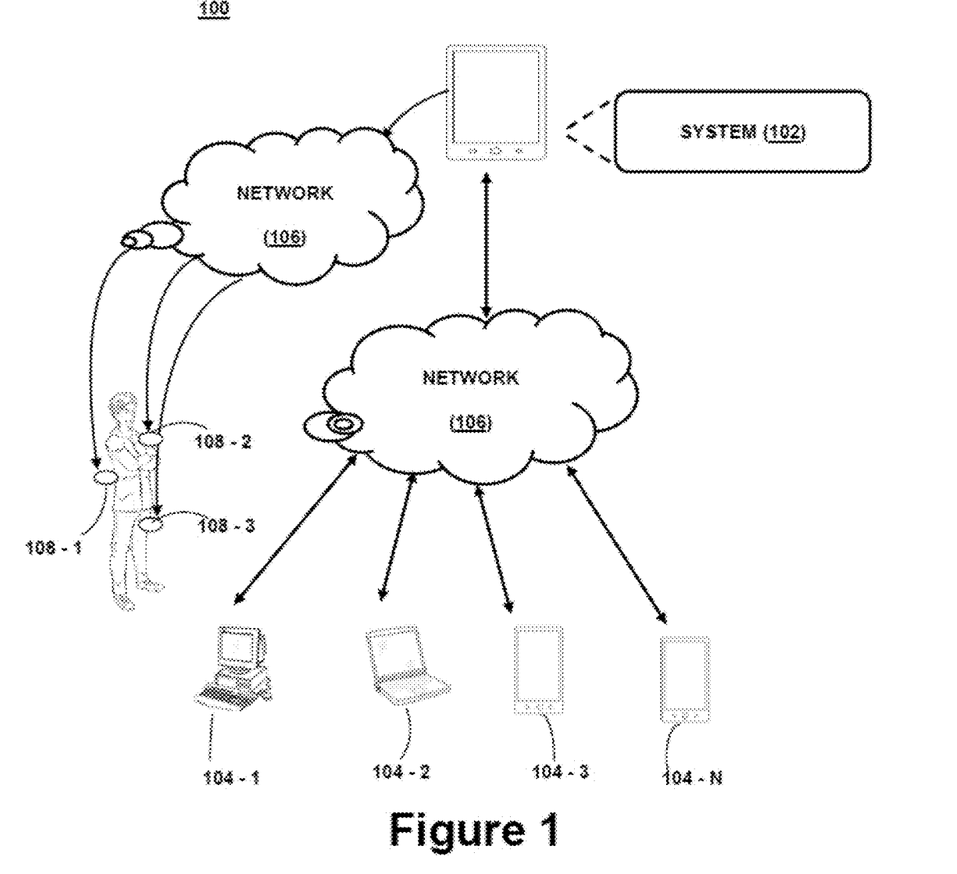
FIG. 1 illustrates a network implementation of a system for dynamically modifying settings of a communication device based on the activity state of the communication device's user, in accordance with an embodiment of the present subject matter.

Referring now to FIG. 1, a network implementation 100 of a system 102 for method for dynamically modifying settings of a communication device based on an activity state of a user of the communication device is disclosed. In order to modify the settings, initially, the system 102 captures values corresponding to a plurality of physiological parameters associated to a plurality of activity states. After capturing the values, the system 102 enables the user to configure, one or more rules based on the values corresponding to the plurality of physiological parameters. In one aspect, each rule may correspond to an activity state of the user. The system 102 further enables the user to configure one or more events, to be triggered, corresponding to each of the one or more rules for modifying settings of the communication device. After configuring the one or more rules and the one or more events, the system 102 determines an activity state, in real-time, from the plurality of activity states based upon at least one real time value captured corresponding to at least one physiological parameter. Subsequent to the determination of the activity state, the system 102 triggers an event, of the one or more events, based on a rule configured corresponding to the activity state in order to dynamically modify the settings of the communication device.

Although the present disclosure is explained considering that the system 102 is implemented on the communication device such as smart phone, it may be understood that the system 102 may also be implemented in a variety of computing systems, such as a laptop computer, a desktop computer, a notebook. It will be understood that the system 102 may be accessed by multiple users through one or more user devices 104-1, 104-2, 104-3, 104-N, collectively referred to as user 104, hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106. It may be understood from the FIG. 1 that the system 102 is coupled with one or more wearable devices, collectively referred to as a wearable device 108. The wearable device 108 is communicatively coupled to the system 102 through the network 106.

In one implementation, the network 106 may be a wireless network, a wired network or a combination thereof. The network 106 can be implemented as one of the different types of networks, such as intranet, local area network (LAN), wide area network (WAN), the internet, Bluetooth™, Bluetooth LE™, ZIGBEE™, Radio Frequency (RF) and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
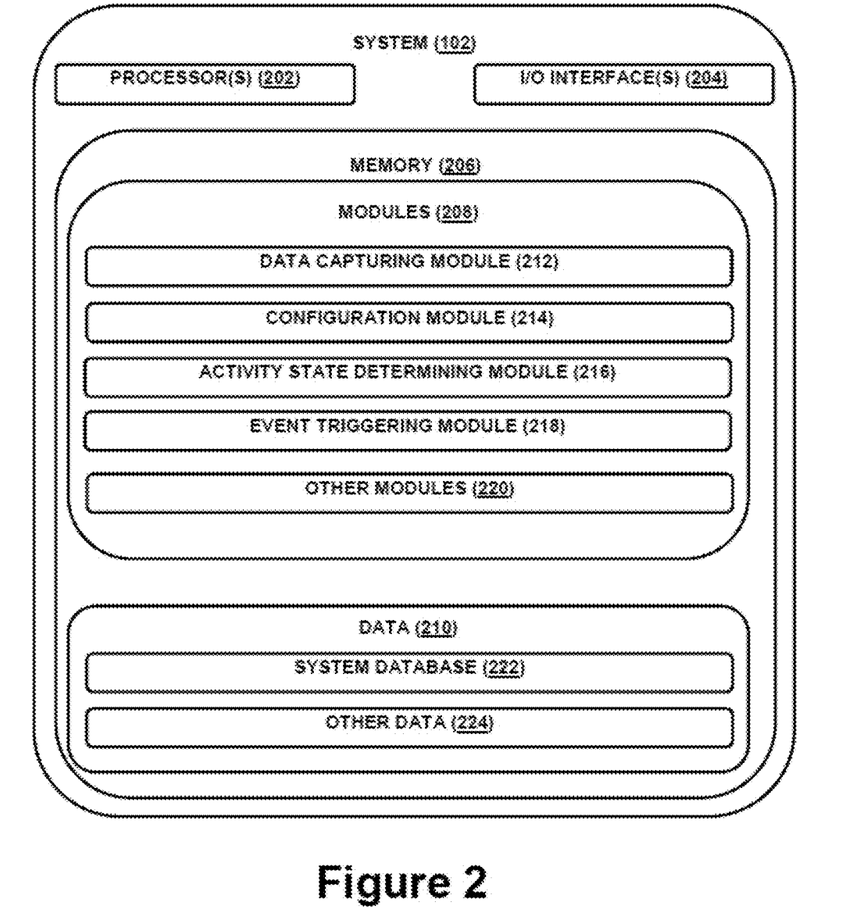
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data capturing module 212, a configuration module 214, an activity state determining module 216, an event triggering module 218 and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 218. The detailed description of the system 102 along with the modules 208 will now be described referring to FIGS. 2 and 3.

Figure 3:
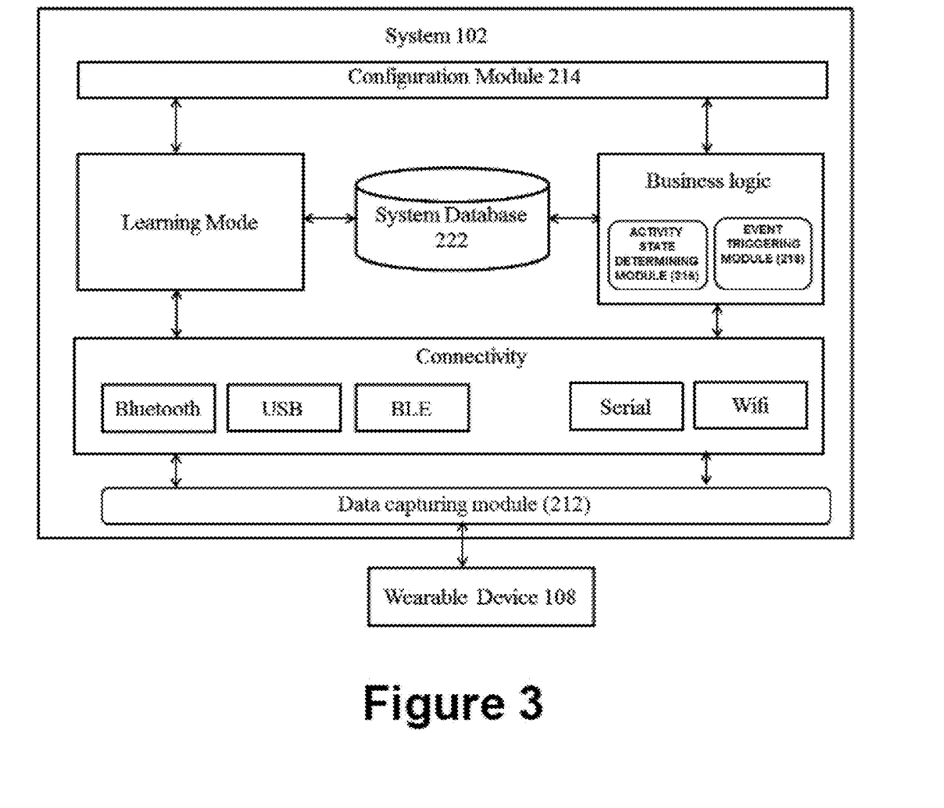
FIG. 3 illustrates the system, in accordance with an embodiment of the present subject matter.

As there are challenges observed in the existing art, the challenges necessitate the need for dynamically modifying settings of a communication device based on an activity state of a user of the communication device. Examples of the activity state may include, but not limited to, Sleeping, Jogging, Sitting in office, and Sitting in canteen. In order to dynamically modify the settings, initially, the system 102 is operated in a learning mode 302 as shown in FIG. 3. The learning mode facilitates the system 102 to learn values associated to a plurality of physiological parameters, and thereby determining an event, to be triggered, corresponding to a rule for modifying the settings of the communication device. For modifying the settings, the system 102 may employ the data capturing module 212, the configuration module 214, the activity state determining module 216, and the event triggering module 218. It must be understood that the aforementioned modules are present in the communication device. The detailed functioning of the modules as described below.

In the learning mode, the data capturing module 212, initially, captures values corresponding to the plurality of physiological parameters. Examples of the plurality of physiological parameters may include, but not limited to, wrist pulse, Peripheral capillary oxygen saturation (SPO2), Temperature, Electrocardiogram (ECG), Body vibrations, Body orientation with compass, Global Positioning System (GPS), and Electroencephalography (EEG). The plurality of physiological parameters may be associated to a plurality of activity states of the user. It must be understood that the values may be captured by using one or more wearable devices, hereinafter referred to as a wearable device 108, worn by a user. It is to be noted that the wearable device 108 is communicatively coupled with the communication device by using Bluetooth™ Universal Serial Bus (USB™), or Bluetooth low energy (BLE™) as shown in FIG. 3. In one aspect, the wearable device 108 is at least one of a pedometer, a SPO2 sensor, an ear rings, a head band, a glass, smart watch, and a smart belt. In one embodiment, the values captured from the wearable device 108 are stored in a system database 222 for future reference.

After capturing the values, the configuration module 214 enables the user to configure one or more rules. In one aspect, the one or more rules are stored in the system database 222. The one or more rules may be configured based on the values corresponding to the plurality of physiological parameters. Examples of the one or more rules may include, but not limited to, putting the communication device in silent mode when the user is sleeping, putting the communication device in silent mode when the user is sitting in office, putting the communication device in switch on mode when the user is jogging, and putting the communication device in loud mode, when the user is sitting in canteen. In one aspect, each rule may correspond to an activity state of the user.

The configuration module 214 further enables the user to configure one or more events. In one aspect, the one or more events are stored in the system database 222. The one or more events, to be triggered, may be configured corresponding to each of the one or more rules for modifying settings of the communication device. Examples of the one or more events may include, but not limited to, putting the communication device in silent mode, putting the communication device in switch on mode, and putting the communication device in loud mode.

In order to elucidate the functioning of the data capturing module 212 and the configuration module 214, consider an example where the system 102 learns from the data the values pertaining to the plurality of physiological parameters such GPS, ECG, Body orientation with compass, Body Vibration captured by the capturing module 212. The below mentioned table 1 indicates the values captured, by the wearable device 108, for GPS, EEG, Body orientation with compass, and Body Vibration for each activity state.

| Activity State | GPS | ECG | Body orientation with compass | Body Vibration |
|---|---|---|---|---|
| Sleeping | X, y, z +/− 2 meter | Predefined pattern | Head towards east | Predefined pattern |
| Jogging | X, y, z +/− 2 kilometer | Running pattern | Head towards east | Predefined pattern |
| Sitting in office | Office location | Sitting pattern | Predefined | Predefined |
| Sitting in canteen | Canteen location | Sitting pattern | Predefined | Predefined |

It must be understood from the table 1 that when the values of GPS, EEG, Body orientation with compass, and Body Vibration are X,y,z+/−2 meter, Predefined pattern, Head towards east, and Predefined pattern respectively, then the activity state of the user is Sleeping. Similarly, if the values of GPS, EEG, Body orientation with compass, and Body Vibration are X,y,z+/−2 kilometer, Running pattern, Head towards east, and Predefined pattern respectively, then the activity state of the user is Jogging. Thus, in this manner, the system 102 learns from the values captured by the data capturing module 212 over a pre-defined period of time and thereby determines the activity state based on the values pertaining to the plurality of physiological parameters.

Once the values are captured, the configuration module 214 enables the user to configure the one or more rules i.e. 'put the communication device in silent mode when the user is sleeping', 'put the communication device in silent mode when the user is sitting in office'. The configuration module 214 further enables the user to configure the one or more events i.e. 'put the communication device in silent mode', 'put the communication device in switch on mode', and 'put the communication device in loud mode'. Thus, in this manner, the one or more rules and the one or more events, corresponding to each rule, are configured based on the values and the activity state of the user.

Subsequent to the configuration of the one or more rules and the one or more events, the activity state determining module 216 determines an activity state, in real-time, from the plurality of activity states. In one aspect, the activity state may be determined based upon at least one real time value captured, by the data capturing module 212, corresponding to at least one physiological parameter. After capturing the at least one real time value, the event triggering module 218 triggering an event, of the one or more events, based on a rule configured corresponding to the activity state.

For example, if the real time values captured for GPS, EEG, Body orientation with compass, and Body Vibration are X,y,z+/−2 kilometer, Running pattern, Head towards east, and Predefined pattern respectively, then the activity state determining module 216 determines the activity state as 'Sleeping'. Upon determination of the activity state of the user, the event triggering module 218 triggers an event that puts the communication device of the user in silent mode. This is because the user, while the system 102 is in the learning mode, had configured a rule that 'puts the communication device in silent mode', when the user is sleeping. Therefore, based on the rule configured, the event triggering module 218 triggers the event that 'puts the communication device in the silent mode'. Thus, in this manner, the system 102 dynamically modifies the settings of the communication device based on the activity state of the user of the communication device.

Figure 4:
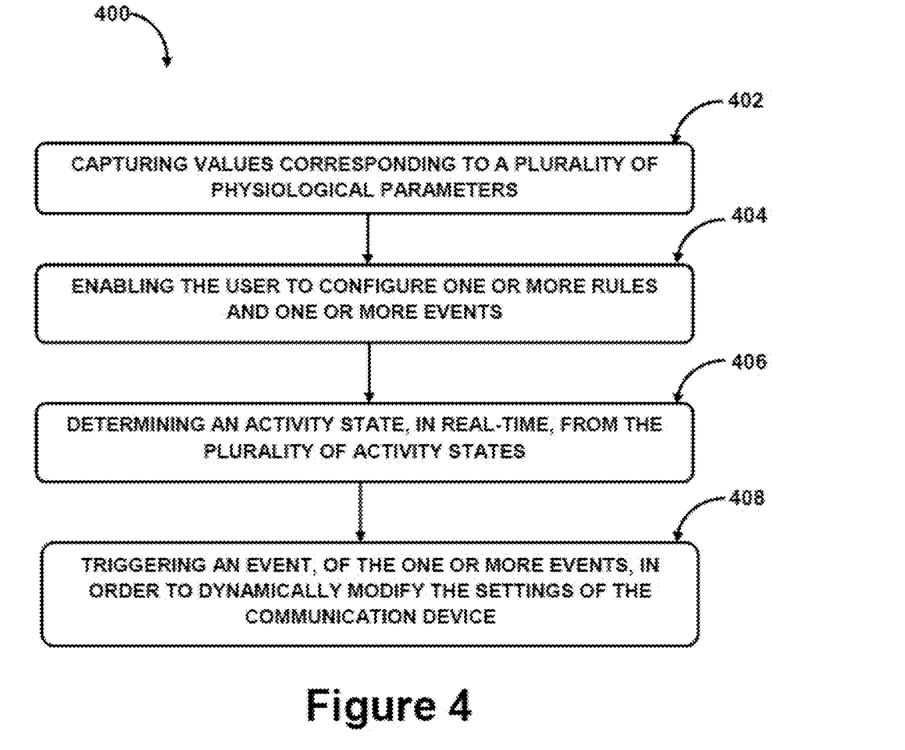
FIG. 4 illustrates a method for dynamically modifying the settings of the communication device, in accordance with an embodiment of the present subject matter

Referring now to FIG. 4, a method 400 for dynamically modifying settings of a communication device based on an activity state of a user of the communication device is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a plurality of physiological parameters, associated to a plurality of activity states of a user, may be captured. In one implementation, the plurality of physiological parameters may be captured by the data capturing module 212.

At block 404, one or more rules and one or more events, corresponding to each of the one or more rules, may be configured. In one aspect, the one or more rules may be configured based on the values corresponding to the plurality of physiological parameters. In one aspect, the one or more events corresponding to each of the one or more rules for modifying settings of the communication device. In one implementation, the one or more rules and the one or more events may be configured by the configuration module 214.

At block 406, an activity state, in real-time, may be determined from the plurality of activity states based upon at least one real time value captured corresponding to at least one physiological parameter. In one implementation, the activity state may be determined by the activity state determining module 216.

At block 408, an event, of the one or more events, may be triggered based on a rule configured corresponding to the activity state in order to dynamically modify the settings of the communication device. In one implementation, the event may be triggered by the event triggering module 218.

Exemplary embodiments discussed above may provide certain advantages. Though not required to practice aspects of the disclosure, these advantages may include those provided by the following features.

Some embodiments enable a system and a method to dynamically modify settings of a communication device based on an activity state of a user of the communication device.

Some embodiments enable a system and a method to capture values pertaining to a plurality of physiological parameters and modify the settings of the communication device based on a pre-defined configuration.

Although implementations for methods and systems for dynamically modifying settings of a communication device based on an activity state of a user of the communication device have been described in language specific to structural features and/or methods, it is to be understood that the appended claims are not necessarily limited to the specific features or methods described. Rather, the specific features and methods are disclosed as examples of implementations for dynamically modifying the settings of the communication device.

We claim:

1. A method for dynamically modifying settings of a communication device based on an activity state of a user of the communication device, the method comprising:
   capturing, by a processor of a communication device, values corresponding to a plurality of physiological parameters associated to a plurality of activity states of a user, wherein the values are captured using one or more wearable devices worn by a user;
   enabling, by the processor, the user to configure
      one or more rules based on the values corresponding to the plurality of physiological parameters, wherein each rule corresponds to an activity state of the user, and
      one or more events, to be triggered, corresponding to each of the one or more rules for modifying settings of the communication device, wherein each event is configured upon the values learned during a learning mode;
   determining, by the processor, an activity state, in real-time, from the plurality of activity states based upon at least one real time value captured corresponding to at least one physiological parameter; and
   triggering, by the processor, an event, of the one or more events, based on a rule configured corresponding to the activity state in order to dynamically modify the settings of the communication device.

2. The method of claim 1, wherein the plurality of physiological parameters comprises wrist pulse, Peripheral capillary oxygen saturation (SPO2), Temperature, Electrocardiogram (ECG), Body vibrations, Body orientation with compass, Global Positioning System (OPS), Electroencephalography (EEG), or any combination thereof.

3. The method of claim 1, wherein the activity state is at least one of sleeping, jogging, sitting in an office, and sitting in a canteen.

4. The method of claim 1, wherein the one or more events comprise at least one of putting the communication device in silent mode, putting the communication device in switch on mode, and putting the communication device in loud mode.

5. The method of claim 1, wherein the one or more rules comprise:
   a. putting the communication device in silent mode, when the user is sleeping,
   b. putting the communication device in silent mode, when the user is sitting in office,
   c. putting the communication device in switch on mode, when the user is jogging, and
   d. putting the communication device in loud mode, when the user is sitting in canteen.

6. A system for dynamically modifying settings of a communication device based on an activity state of a user of the communication device, the system comprising:
   a processor; and
   a memory coupled to the processor, wherein the processor is capable of executing a plurality of modules stored in the memory, and wherein the plurality of modules comprising:
      a data capturing module for capturing values corresponding to a plurality of physiological parameters associated to a plurality of activity states of a user, wherein the values are captured using one or more wearable devices worn by a user;
      a configuration module for enabling the user to configure
         one or more rules based on the values corresponding to the plurality of physiological parameters, wherein each rule corresponds to an activity state of the user, and
         one or more events, to be triggered, corresponding to each of the one or more rules for modifying settings of the communication device, wherein each event is configured upon the values learned during a learning mode;
      an activity state determining module for determining an activity state, in real-time, from the plurality of activity states based upon at least one real time value captured corresponding to at least one physiological parameter; and an event triggering module for triggering an event, of the one or more events, based on a rule configured corresponding to the activity state in order to dynamically modify the settings of the communication device.

7. The system of claim 6, wherein the value pertaining to each of the plurality of physiological parameters are stored in a system database.

8. The system of claim 6, wherein the plurality of physiological parameters comprises wrist pulse, Peripheral capillary oxygen saturation (SPO2), Temperature, Electrocardiogram (ECG), Body vibrations, Body orientation with compass, Global Positioning System (GPS), Electroencephalography (EEG), or any combination thereof.

9. The system of claim 6, wherein the activity state is at least one of sleeping, jogging, sitting in an office, and sitting in a canteen.

10. The system of claim 6, wherein the one or more events comprise at least one of putting the communication device in silent mode, putting the communication device in switch on mode, and putting the communication device in loud mode.

11. The system of claim 6, wherein the one or more rules comprise:
 a. putting the communication device in silent mode, when the user is sleeping,
 b. putting the communication device in silent mode, when the user is sitting in office,
 c. putting the communication device in switch on mode, when the user is jogging, and
 d. putting the communication device in loud mode, when the user is sitting in canteen.

12. A non-transitory computer readable medium embodying a program executable in a computing device for dynamically modifying settings of a communication device based on an activity state of a user of the communication device, the program comprising a program code:
 a program code for capturing values corresponding to a plurality of physiological parameters associated to a plurality of activity states of a user, wherein the values are captured using one or more wearable devices worn by a user;
 a program code for enabling the user to configure
  one or more rules based on the values corresponding to the plurality of physiological parameters, wherein each rule corresponds to an activity state of the user, and
  one or more events, to be triggered, corresponding to each of the one or more rules for modifying settings of the communication device, wherein each event is configured upon the values learned during a learning mode;
 a program code for determining an activity state, in real-time, from the plurality of activity states based upon at least one real time value captured corresponding to at least one physiological parameter; and
 a program code for triggering an event, of the one or more events, based on a rule configured corresponding to the activity state in order to dynamically modify the settings of the communication device.

* * * * *